Patented July 12, 1932

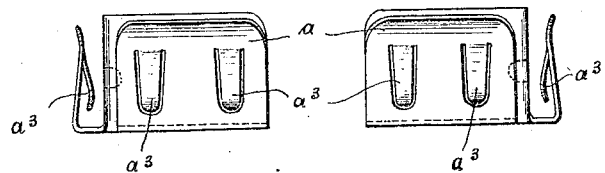
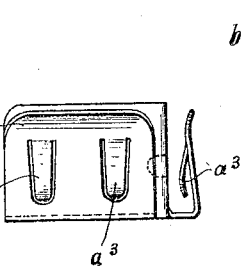
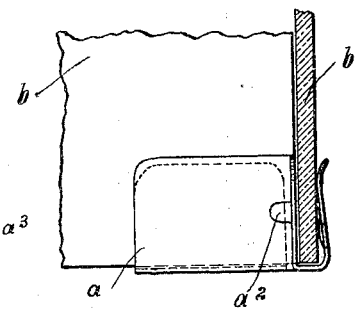
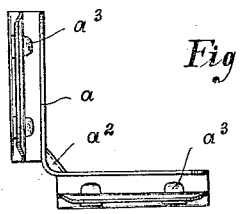
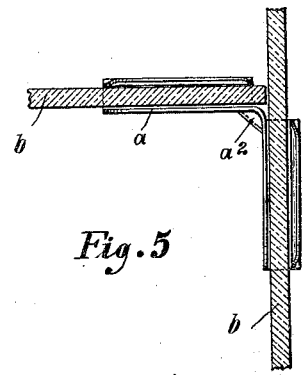
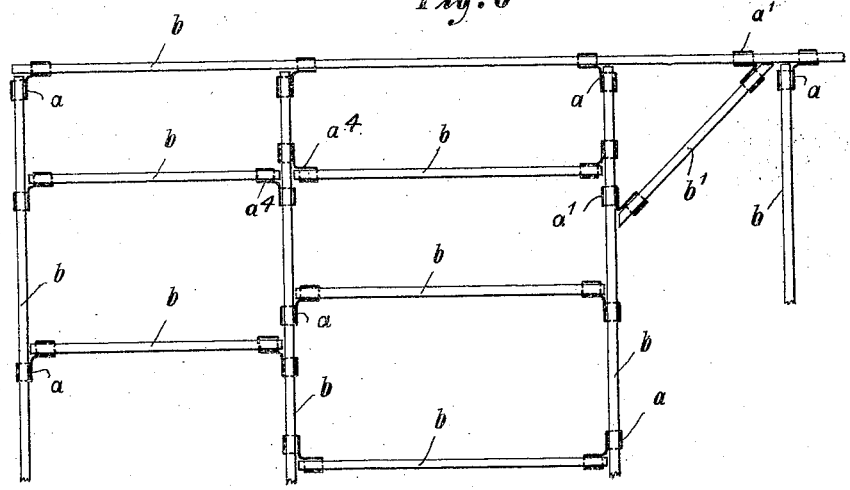

1,867,107

UNITED STATES PATENT OFFICE

JOHANN PETER SCHMIDT, JR., OF REMSCHEID, GERMANY

CORNER BRACKET

Application filed September 18, 1929, Serial No. 393,456, and in Germany February 18, 1929.

This invention relates to a bracket for connecting glass plates and mirrors in show cases and the like, and consists in the provision of a plurality of interconnected members of U-shaped cross-section arranged at an angle to one another and adapted to grip the edges of the plates.

Figs. 1 and 2 of the accompanying drawing represent front views at right angles of a bracket comprising two members, Fig. 3 is a top view of the bracket, Fig. 4 is a rear view of the bracket in use, Fig. 5 is a top view of Fig. 4, and Fig. 6 is a top view of an assemblage of glass plates connected by different forms of brackets.

The bracket $a$ consists of a plurality of inter-connected U-shaped or channelled members adapted to grip the edges of the glass plates $b$ and arranged so as to maintain the plates at the required angle relative to one another. The bracket is preferably stamped out of metal plate and formed with resilient tongues $a^3$ arranged so as to bear against the plates and steady the joints.

Figs. 1–5 illustrate a bracket comprising two members arranged at right angles to each other. The rear leaves of the two members are integral and may be strengthened at the bend by pressed-out ribs $a^2$ or by flanged edges. The front leaves are bent off from the rear leaves.

Fig. 6 shows an assemblage of plates connected by means of brackets of this kind. It will be noticed that one plate $b^1$ is placed diagonally relative to the adjacent plates and connected to the latter by brackets the two members of which are arranged at an angle of 45° to each other. The bracket $a^4$ comprises four members all of which are interconnected and arranged at right angles to one another.

I claim:—

A corner bracket support particularly for plate glass and the like, consisting of a pair of U-shaped members interconnected at an angle on one side, each member on the other side comprising a clip projected inwardly to form a bearing surface at its upper edge and at least one tongue stamped therefrom forming an inwardly bent tongue to form a bearing member at the end of the tongue, the upper edge of the clip and the end of the tongue forming two spaced bearing points on the plate glass to support and secure the plate in position.

JOHANN PETER SCHMIDT, Junior.